United States Patent [19]
Ruzicka

[11] Patent Number: 5,904,729
[45] Date of Patent: May 18, 1999

[54] AUTOMATED DIRECTOR LIGHT SYSTEM FOR AERIAL REFUELING OPERATIONS

[75] Inventor: Dennis E. Ruzicka, Enumclaw, Wash.

[73] Assignee: The Boeing Company, Seattle, Wash.

[21] Appl. No.: 08/810,417

[22] Filed: Mar. 4, 1997

[51] Int. Cl.⁶ .................................................. B64D 39/00
[52] U.S. Cl. .................. 701/300; 244/135 A; 244/135 R
[58] Field of Search ................... 704/3, 300; 244/135 R, 244/135 A, 161; 348/113, 116, 117; 340/958

[56] References Cited

U.S. PATENT DOCUMENTS 5,810,292  9/1998  Garcia, Jr. et al. ................. 244/135 R

*Primary Examiner*—Gary Chin
*Attorney, Agent, or Firm*—Christensen O'Connor Johnson & Kindness PLLC

[57] ABSTRACT

A method and apparatus for generating visual information for an operator in a first aircraft and a pilot in a second aircraft regarding the second aircraft's position relative to a first aircraft. A 3-D camera system (72) generates a real time 3-D video image of the second aircraft. A selecting device (82) provides selection of a stored geometric model based on the second aircraft type. A display monitor (83) displays the generated real time 3-D video image and the selected geometric model. A matching device (84) matches the displayed geometric model to the displayed real time 3-D video image. A processor (84) determines the position of the second aircraft relative to stored zone information according to the matched geometric model and generates control signals according to the determined second aircraft position. Director lights (88) mounted on the outside of the first aircraft display position information visible to the pilot of the second aircraft according to the generated control signals. The monitor also displays the position of the second aircraft relative to a boom.

9 Claims, 18 Drawing Sheets

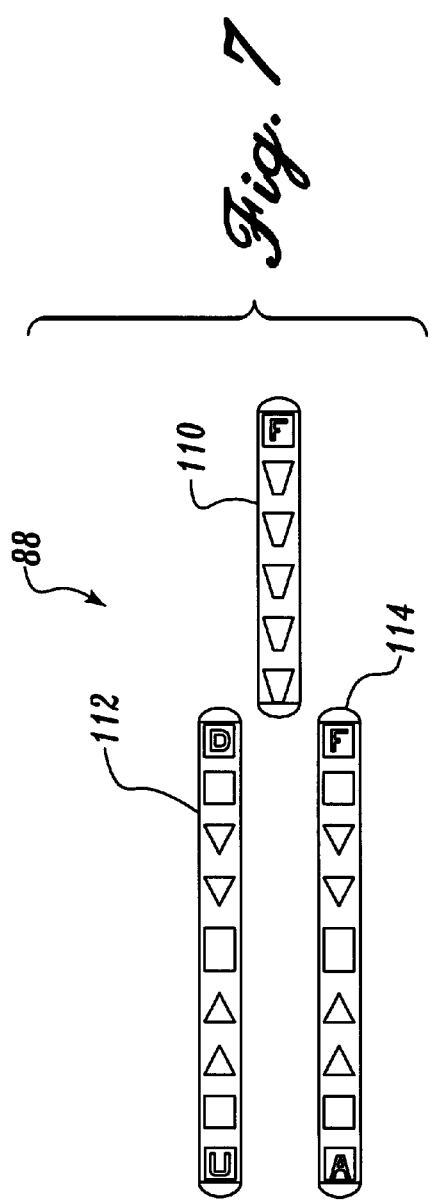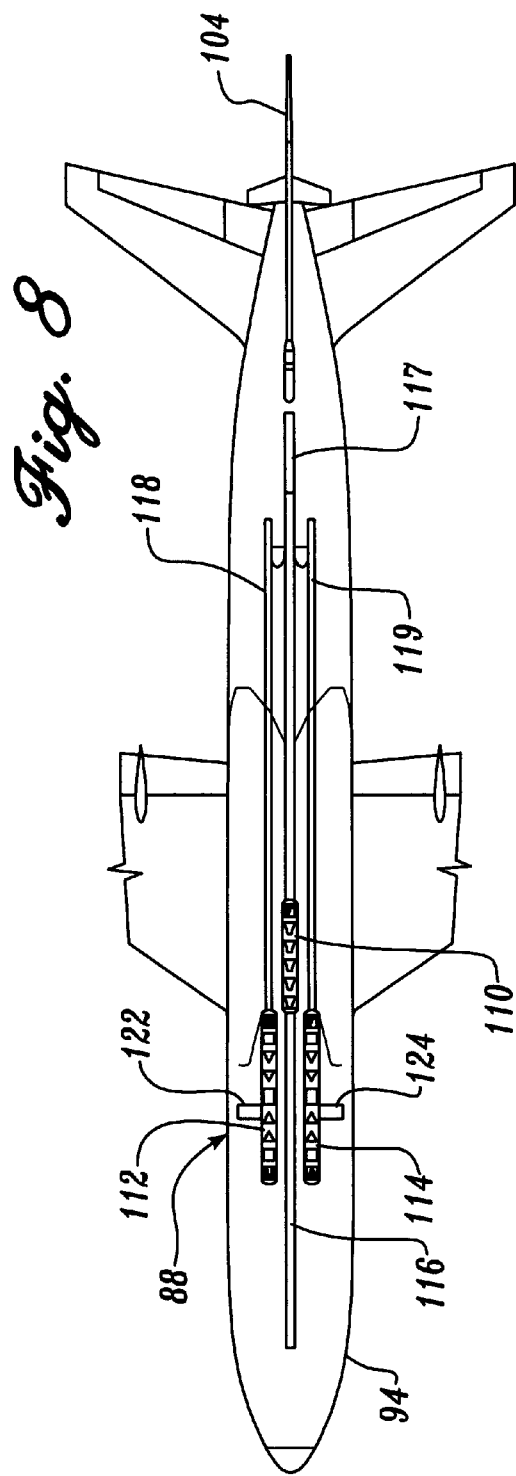

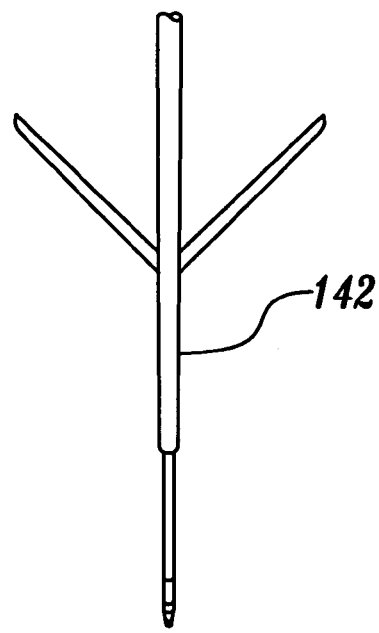
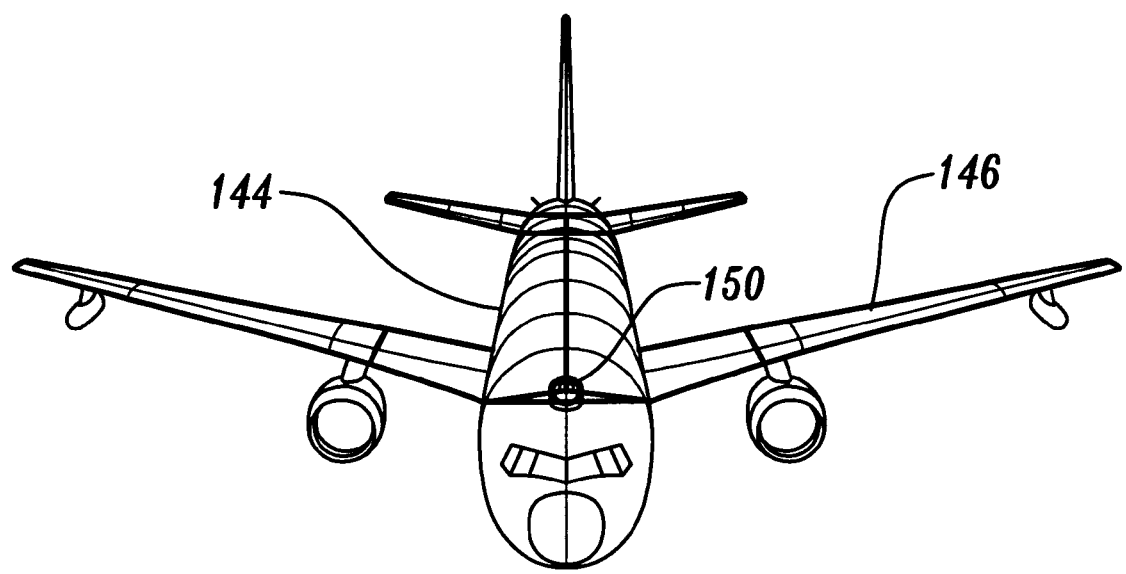
Fig. 13

AUTOMATED DIRECTOR LIGHT SYSTEM FOR AERIAL REFUELING OPERATIONS

FIELD OF THE INVENTION

This invention relates to air-to-air refueling director light systems and, more particularly, an improved director light system for generating more accurate refueling zone and approach information.

BACKGROUND OF THE INVENTION

Aerial refueling tanker airplanes use aerial refueling booms for transferring fuel to various types of receiving aircraft. The present U.S. Air Force operational tanker fleet (KC-135 and KC-10) utilizes director light systems that provide direction queuing to receiver pilots after contact has been made between the refueling boom nozzle and the receiving aircraft's receptacle. Operation of the director light system is automatic in the contact mode. The director light system includes two light arrays, as shown in FIGS. 1 and 2. The two light arrays include longitudinally positioned lights that display present contact position relative to the optimum contact position. The display presents longitudinal and vertical information important to the pilot of the receiving aircraft. The reference for the presented information is the refueling aircraft. The light arrays may be operated manually by the boom operator using visual cues or by a determination of the present contact position. The present contact position is determined according to refueling boom elevation position and telescopic length sensing of the refueling boom when the refueling nozzle and the receiving aircraft's receptacle are coupled. FIGS. 1 and 2 illustrate the director light systems presently used a KC-135s and KC-10s, respectively. The light assemblies for both the KC-135 and KC-10 are positioned on the lower fuselage just forward of the wings' leading edge. The row of lights on the port side of the aircraft indicates aircraft elevation relative to optimum fueling position. The row of lights on the starboard side of the fuselage indicates refueling boom telescoping position or the aircraft's fore and aft position relative to the optimum refueling point. These systems are effective tools for generating accurate contact position information. Also, they are relatively simple light arrays which are easy for pilots to understand. This ease in understanding helps lessen the receiving pilot's task load, which is already quite large with management of complicated systems internal to the aircraft. However, this system only presents contact position information. Getting to the contact position can be half the battle for receiving aircraft pilots, especially, if that pilot is greatly fatigued or stressed as a result of a difficult sortie, bad weather, or an emergency of some sort. Also, the boom operator does not receive adequate or any information that may allow the boom operator to direct the receiving aircraft pilot to the contact position.

An improved boom refueling light system is presented in U.S. Pat. No. 4,158,885 (hereinafter the '885 patent). The '885 patent includes an optical sensor for sensing receiving aircraft position and two light arrays on the belly of the aircraft. The two light arrays are controlled according to control information generated by the optical sensor and associated components. This system provides useful information through the light array assembly on the refueling aircraft that easily enables the receiving aircraft pilot to judge the receiving aircraft's position relative to the refueling boom. However, as shown in FIG. 1 of the '885 patent, the refueling boom can block the electro-optical sensor's line-of-sight to the retroreflector on the receiving aircraft. If the block occurs for a few seconds or more, a disconnect procedure may initiate or the system may continue presenting the last determined receiver aircraft position. In the latter case, the light arrays would therefore display the last determined receiver aircraft position information, which could be dangerously inaccurate. Also, reflectors must be mounted on thousands of receiving aircraft and optical sensor systems mounted onto the tanker aircraft fleet. This and the maintenance required could be prohibitively expensive as compared to just maintaining the old system..

Accordingly, there is a need for a light system that presents accurate and consistent receiving aircraft and receiving aircraft receiving nozzle pre-contact position information to the pilot of a receiving aircraft at all times during refueling. The approach information provided by the light system to the receiving aircraft pilot should be sufficient to allow the pilot to gradually work the receiving aircraft to a desired position for coupling with the refueling boom. The present invention is directed to providing such a refueling light system.

SUMMARY OF THE INVENTION

In accordance with this invention a method and apparatus for generating visual information for an operator in a first aircraft and a pilot in a second aircraft regarding the second aircraft's position relative to a first aircraft are provided. The apparatus includes a 3-D camera system that generates a real time 3-D video image of the second aircraft. A first memory stores at least one geometric model of at least one aircraft. A selecting device provides selection of a stored geometric model according to the second aircraft type. A display device displays the generated real time 3-D video image and the selected geometric model. A matching device matches the displayed geometric model to the displayed real time 3-D video image. A second memory stores predefined zone information. A processor determines second aircraft position relative to the stored zone information according to the matched geometric model and generates control signals according to the determined second aircraft position. Director lights mounted on the outside of the first aircraft display position information visible to the pilot of the second aircraft according to the generated control signals.

In accordance with other aspects of this invention, the zone information includes a predefined elevation plane, a fore/aft plane and an azimuth plane referenced from a predefined point relative to the first aircraft. The control signals include elevation, range and azimuth signals determined according to the determined second aircraft position relative to the predefined elevation plane, fore/aft plane and azimuth plane, respectively.

In accordance with still other aspects of this invention, the director lights include an elevation lightbar array, a fore/aft lightbar array and an approach lightbar array. The elevation lightbar array illuminates according to the generated elevation signals and the fore/aft lightbar array and approach lightbar array illuminate according to the generated range signals.

In accordance with other aspects of this invention, the apparatus further includes an image generator for generating an elevation lightbar image according to generated elevation signals, a fore/aft lightbar image and an approach lightbar image according to generated range signals and an azimuth lightbar image according to generated azimuth signals a the display device.

In accordance with other aspects of this invention, the 3-D camera system includes two CCD cameras mounted to the first aircraft for viewing the airspace below and aft of a predetermined point on the bottom of the first aircraft.

In accordance with other aspects of this invention, the matching device includes a user interactive device for matching the displayed geometric model to the displayed real time 3-D video image.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 7 is a diagram of the director light arrays of the embodiment of the invention shown in FIGS. 4–6;

FIGS. 8 and 9 are views of the bottom of the refueling aircraft;

FIGS. 12 and 13 are partial screen shots from the boom operator display;

DETAILED DESCRIPTION OF THE PREFERRED EMBODIMENT

Figure 1:
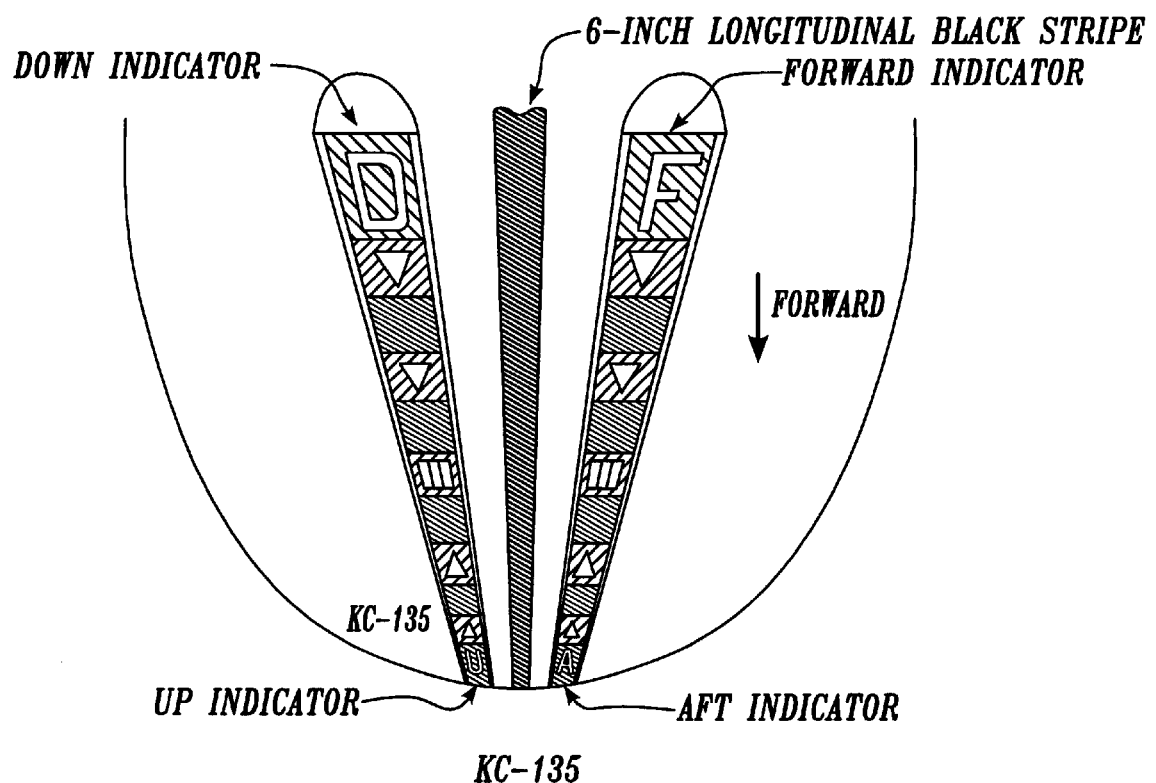
FIG. 1 is a perspective view of a prior art automated director light system as used on a KC-135.
Figure 2:
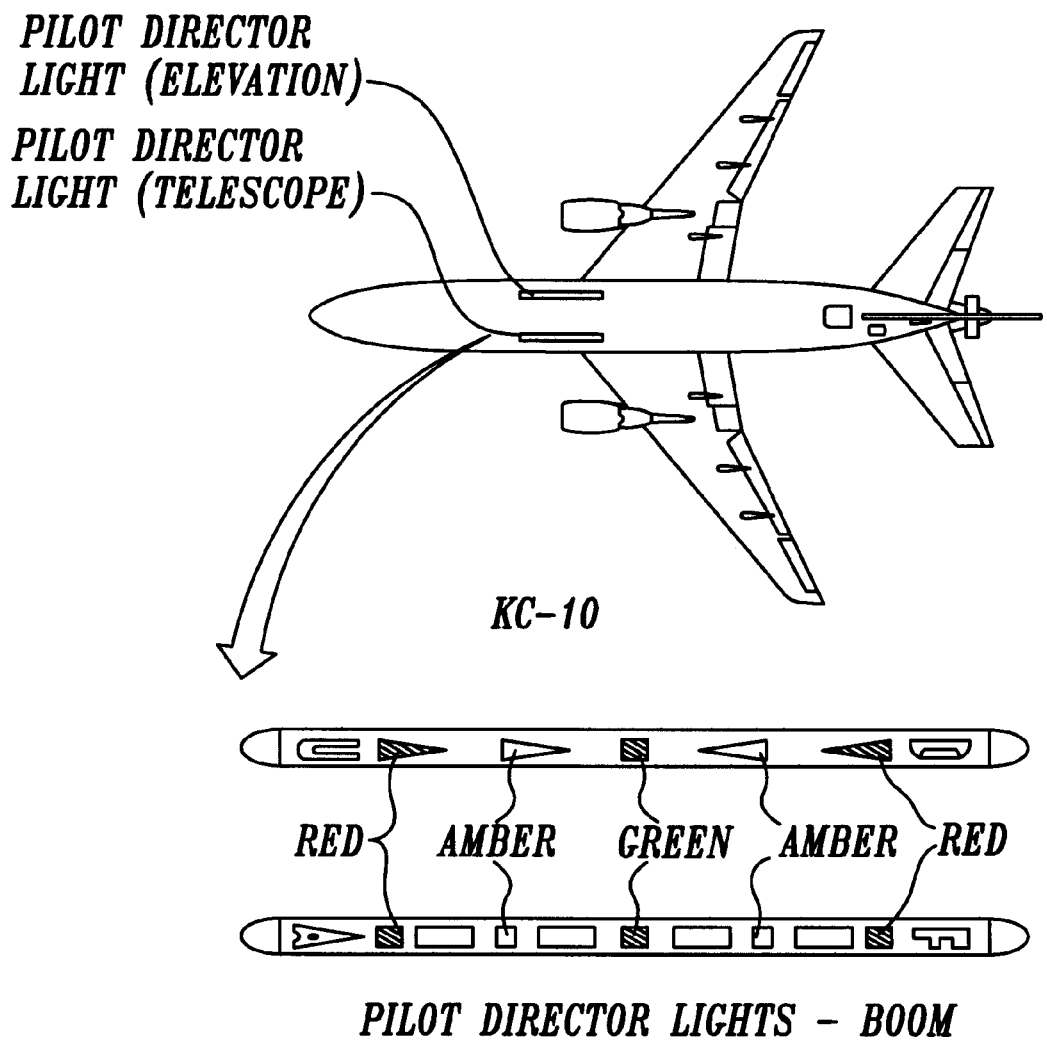
FIG. 2 is a pictorial diagram with a blow-up view of a prior art automated director light system as used on a KC-10.
Figure 3:
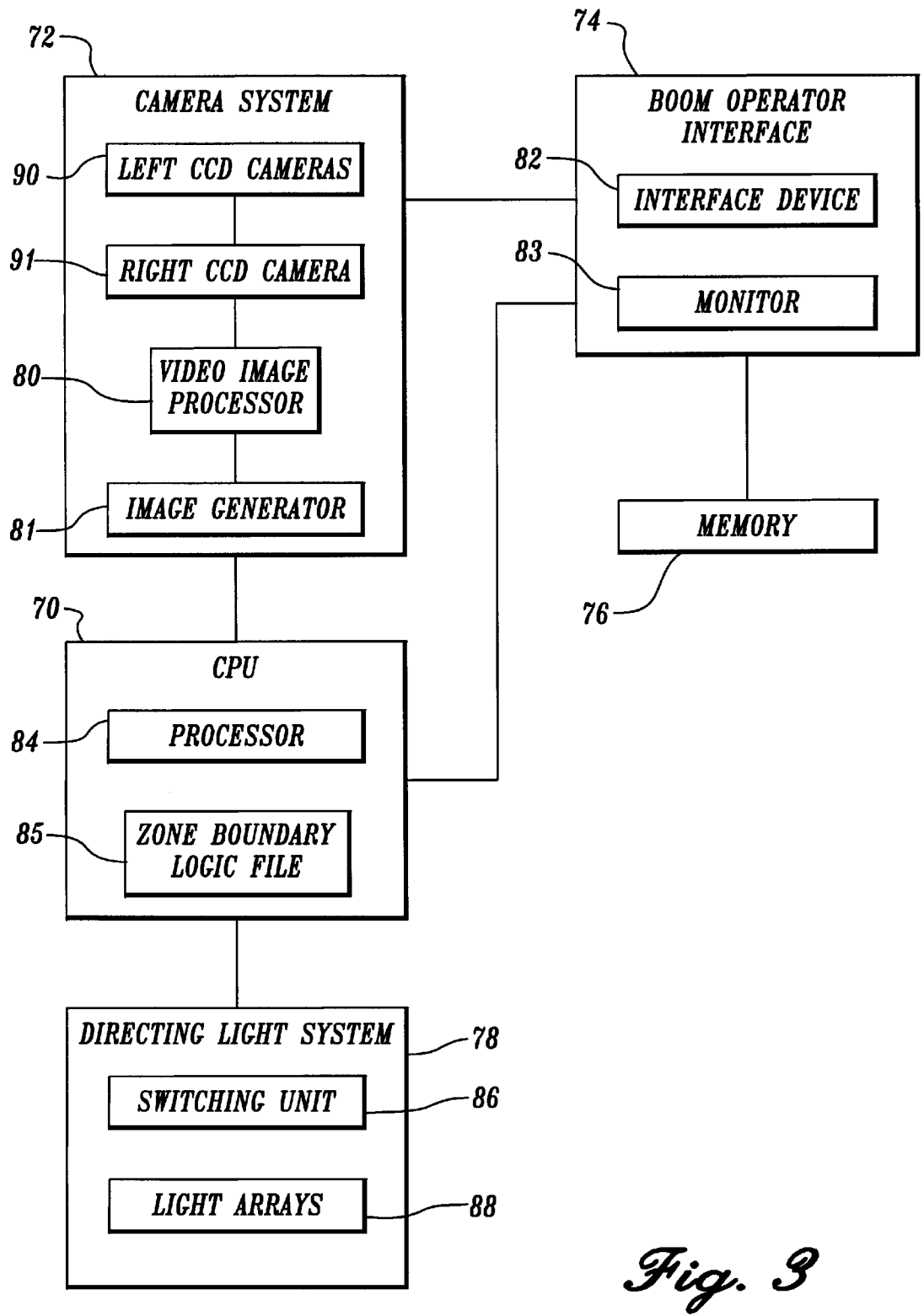
FIG. 3 is a block diagram of an automated director light system formed in accordance with the present invention.

As will be better understood from the following description, the present invention is directed to an automated director light system for aerial refueling that provides greater information to receiving aircraft pilots during flight through an approach zone to a refueling hookup position. As shown in FIG. 3, the automated director light system includes a central processing unit (CPU) 70, a camera system 72, directing light system 78, a boom operator interface 74 and memory 76.

The CPU 70 includes a processor 84 and a zone boundary logic file 85. The camera system 72 includes left and right charge coupled device (CCD) cameras 90 and 91, a video image processor 80 and an image generator 81. The boom operator interface 74 includes a user interface device 82 and a monitor 83. The directing light array system 78 includes a switching unit 86 and light arrays 88.

Figure 4:
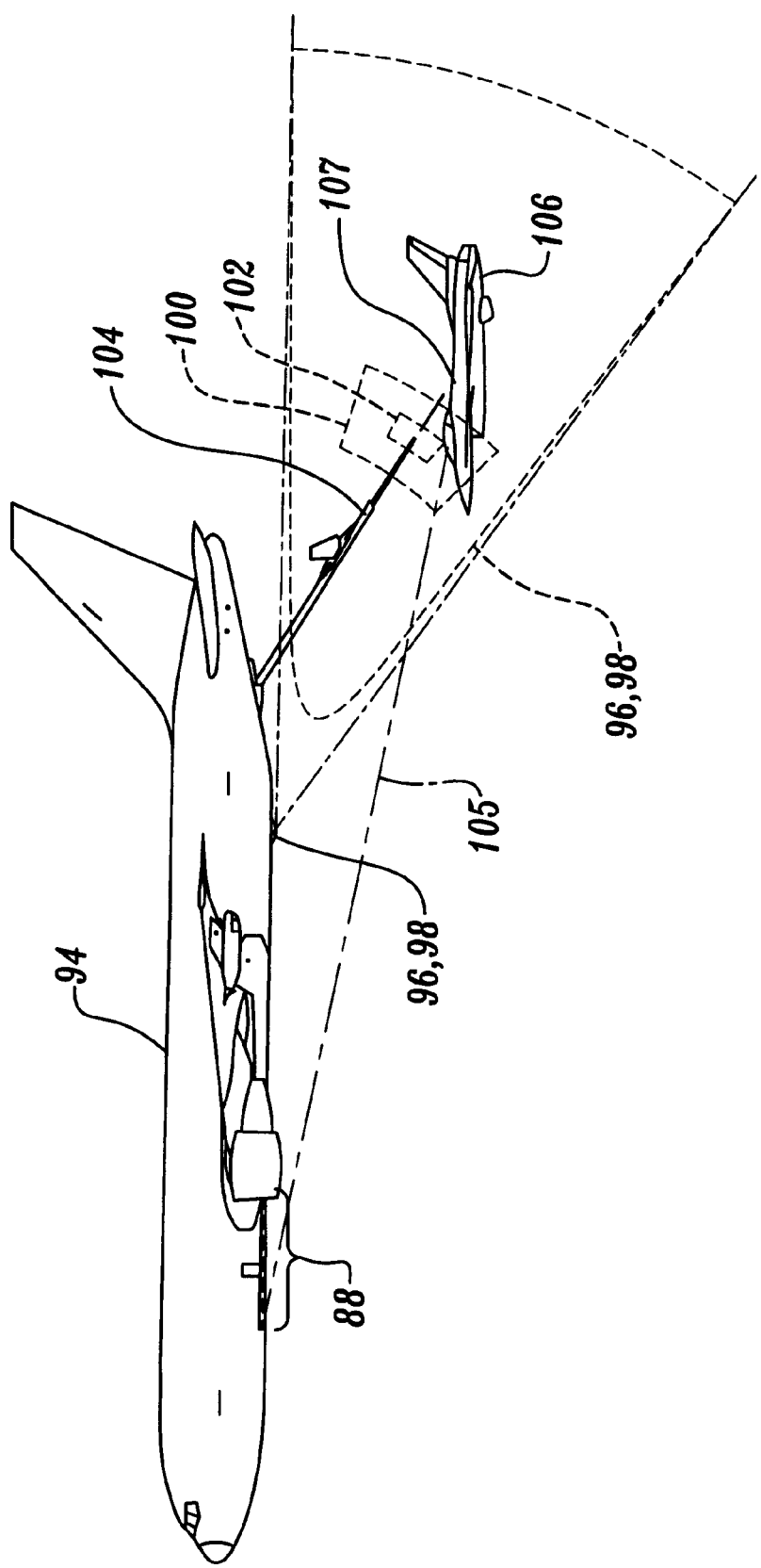
FIG. 4 is a side perspective view of a refueling operation using an automated director light system formed in accordance with the present invention.
Figure 5:
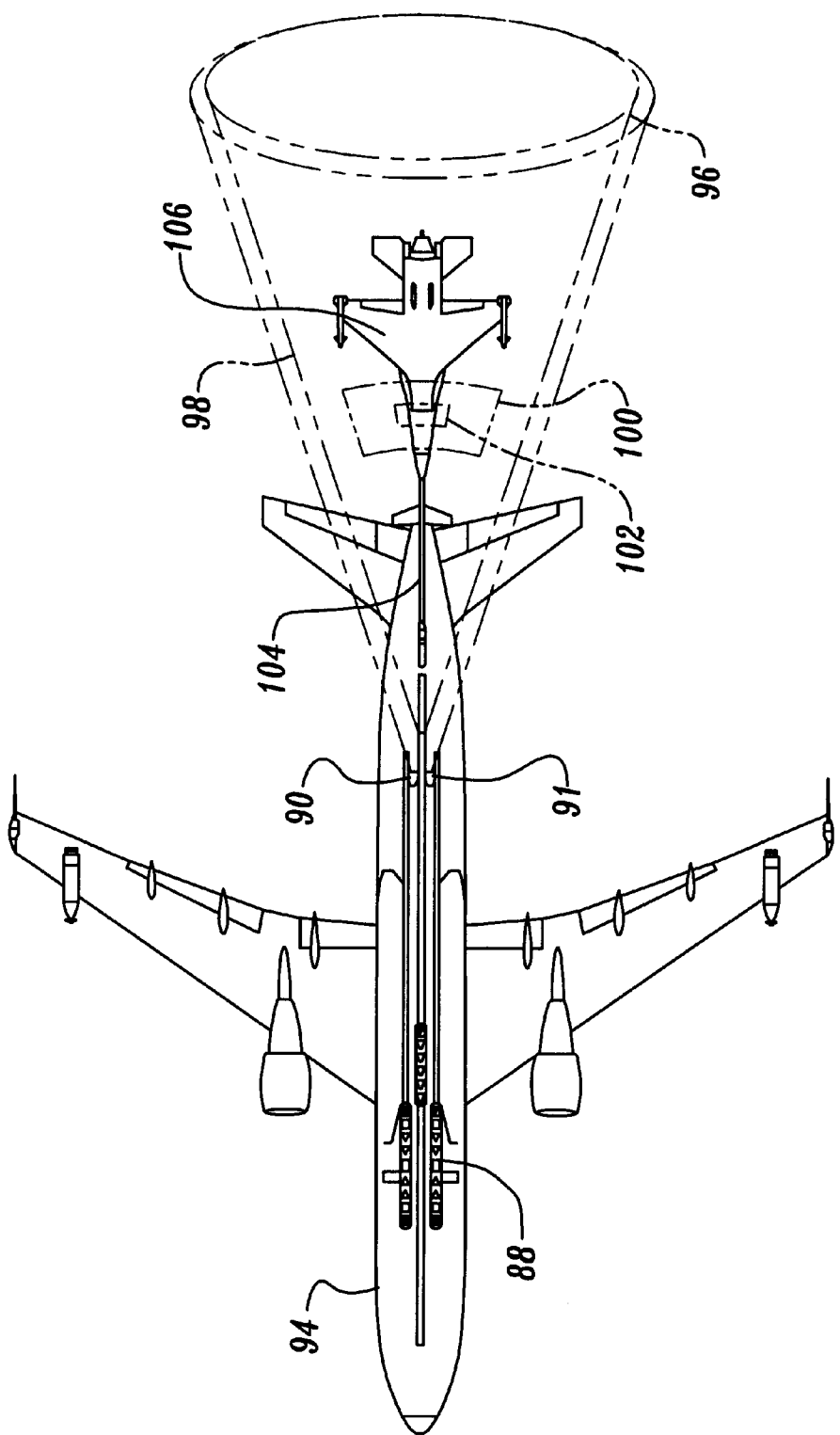
FIG. 5 is a bottom perspective view of the refueling operation of FIG. 4.

As shown in FIGS. 4 and 5, the two CCD cameras 90 and 91 are mounted approximately adjacent to each other on a fixed platform within faired housings attached to the lower aft fuselage of a refueling aircraft 94. The cameras 90 and 91 include lenses having remotely operated focus and zoom capability. Each of the cameras has a three-dimensional (3-D) field of vision cone 96 and 98 located aft and below the refueling aircraft 94. Preferably the apex angle of the cones is 35°. The 3-D cones 96 and 98 encompass a three-dimensional refuel envelope 100, a contact envelope 102, the refueling boom 104, the receiving aircraft 106 and an approach zone the receiving aircraft enters into prior to beginning refuel operations. The receiving aircraft 106 includes a boom nozzle receiver 107 capable of coupling to the refueling boom 104 in order to accomplish fuel transfer.

Figure 6:
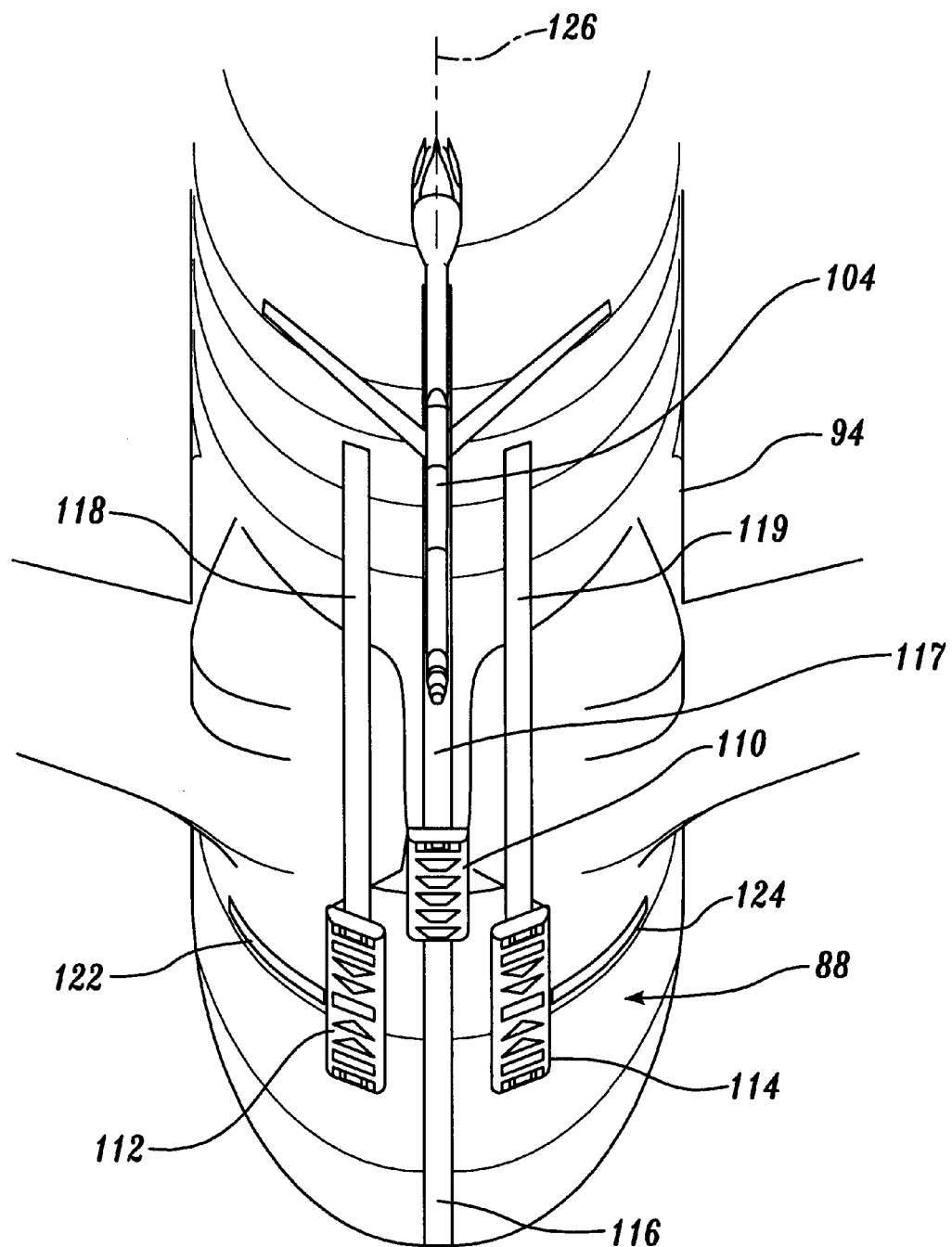
FIG. 6 is a perspective view of the bottom of the refueling aircraft as seen by the receiving aircraft pilot.

Located on the lower forward fuselage of the refueling aircraft 94 is the director light array 88. The director light array 88 is positioned to be clearly viewable by the pilot of the receiving aircraft 106, as shown by line-of-sight line 105. As shown in FIG. 6, the director light array 88 includes an approach zone lightbar 110, an elevation lightbar 112, a fore/aft position lightbar 114, four longitudinal reflectors 116–119 and two lateral reflectors 122 and 124. The approach zone lightbar 110 is located on the aircraft's centerline 126. The first longitudinal reflector 116 extends forward from the approach zone lightbar 110 to approximately the point on the refueling aircraft 94 where the fuselage bends toward the nose of the aircraft or the furthest forward point on the refueling aircraft 94 viewable by the pilot in the receiving aircraft 106 when a refueling approach profile. The second longitudinal reflector 117 extends aft from the approach zone lightbar 110 to approximately the base of the boom 104. The elevation lightbar 112 is longitudinally positioned on the port side of the fuselage. The third longitudinal reflector 118 extends from the aft end of the elevation lightbar 112 to a position forward of the base of the boom 104. The fore/aft lightbar 114 is longitudinally positioned on the starboard side of the refueling aircraft 94. The fourth longitudinal reflector 119 extends from the aft end of fore/aft lightbar 114 to a position forward of the base of the boom 104. The aft ends of the elevation and fore/aft lightbars 112 and 114 are located at longitudinal positions approximately equal to the forward portion of the approach zone lightbar 110, as shown in FIGS. 5, 7 and 8.

Figure 9:
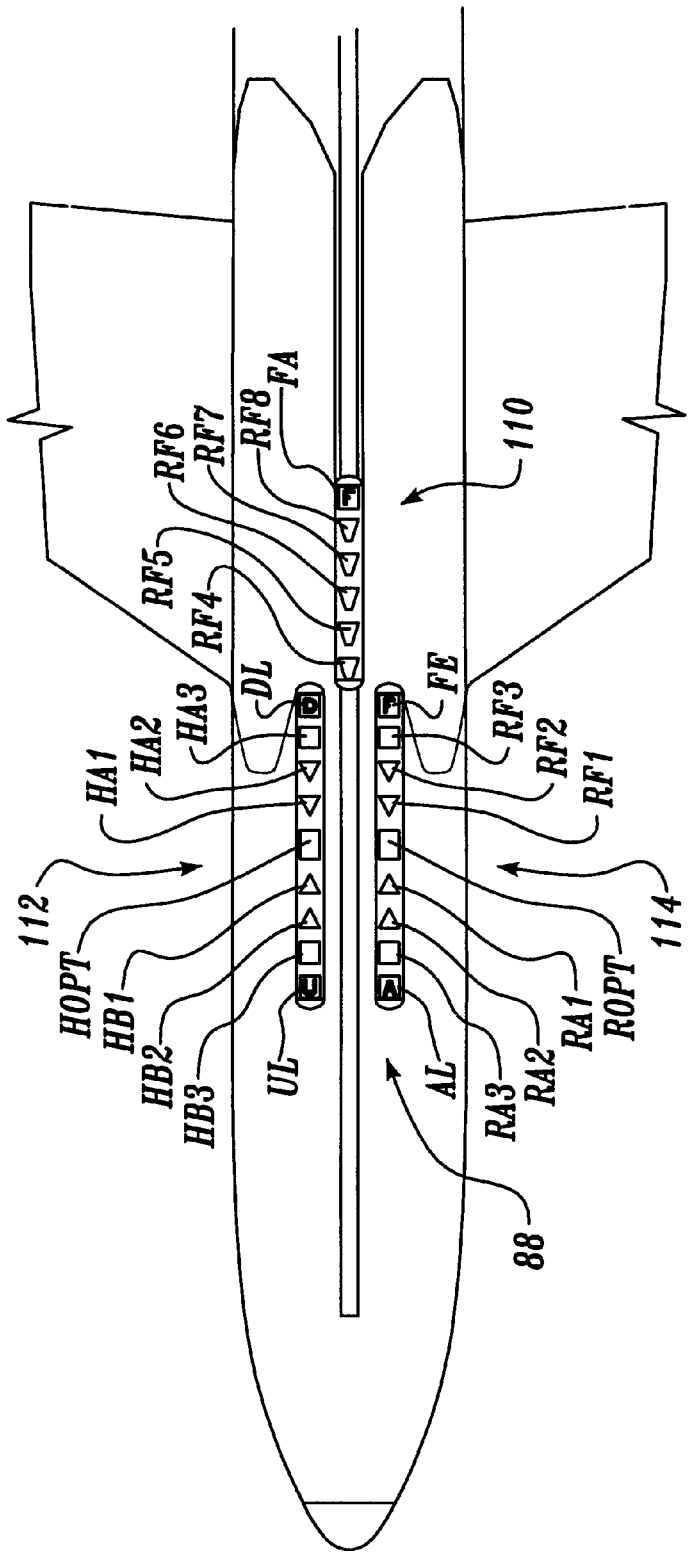

As shown in FIG. 9, each lightbar of the director light array 88 includes multiple lights of various geometry and color. In the illustrated embodiment of the invention, the approach zone lightbar 110 includes six longitudinally arranged lights. The lights in all the lightbars are arranged longitudinally. The aft light FA is square with a blue "F" on a white background. All letters on the lights are readable by the pilot in the receiving aircraft 106. The remaining lights of the approach zone lightbar 110 are trapezoidal-shaped lights that point toward the nose of the aircraft. The trapezoidal-shaped lights are numbered fore to aft, RF4–RF8. Lights RF4–RF8 are cyan color.

The fore/aft lightbar 114 includes nine separate lights. At the ends of the fore/aft lightbar are lights that display a single letter. The aft light FE is square with a blue "F" on a white background. The fore light AL is square with a blue "A" on a white background. Next to the lettered lights AL and FE are red square lights RA3 and RF3, respectively. Forward of square light RF3 are two trapezoidal-shaped cyan colored lights RF1 and RF2. Lights RF1 and RF2 point to the nose of the aircraft. Aft of light RA3 are also two trapezoidal-shaped cyan colored lights RA2 and RA1 that point to the tail of the aircraft. Light RA2 is forward of light RA1 and light RF1 is forward of light RF2. The final light of the fore and aft lightbar is a green-colored, square-shaped light ROPT located between lights RA1 and RF1. The long side of light ROPT is parallel to the centerline of refueling aircraft 94.

The elevation lightbar 112 also includes nine lights similar in shape and position to those of the lights in the fore and aft lightbar. The only difference between the geometric shape of lights in the elevation lightbar 112 and that of the lights in the fore/aft lightbar 114 is that the trapezoidal-shaped lights are triangular shaped. In the elevation lightbar 112, the aft light DL is a blue "D" on a white background. The forward light UL is a blue "U" on a white background. Inside the lettered lights UL and DL are lights HB3 and HA3, respectively. Lights HB3 and HA3 are colored red. Aft of light HB3 are the triangular lights HB2 and HB1. Forward of light HA3 are lights HA2 and HA1. Light HB2 is forward of HB1, and light HA1 is forward of HA2. Lights HA1, HA2, HB1 and HB2 are yellow. Finally, located between lights HB1 and HA1 is the green rectangular-shaped light HOPT.

The lateral reflectors 122 and 124 (FIG. 6) extend orthogonal from the outer edge of the elevation and fore/aft lightbars 112 and 114. The lateral reflectors 122 and 124 are positioned on the fuselage slightly forward of lights HOPT and ROPT. The lateral reflectors 122 and 124 have greater thickness than the longitudinal reflectors 116–119. Lateral reflector locations slightly forward of lights HOPT and ROPT allow the pilot to view the lateral reflectors 122 and 124 as if they were collocated with lights HOPT and ROPT, if the receiving aircraft is a optimum approach profile.

Figure 10:
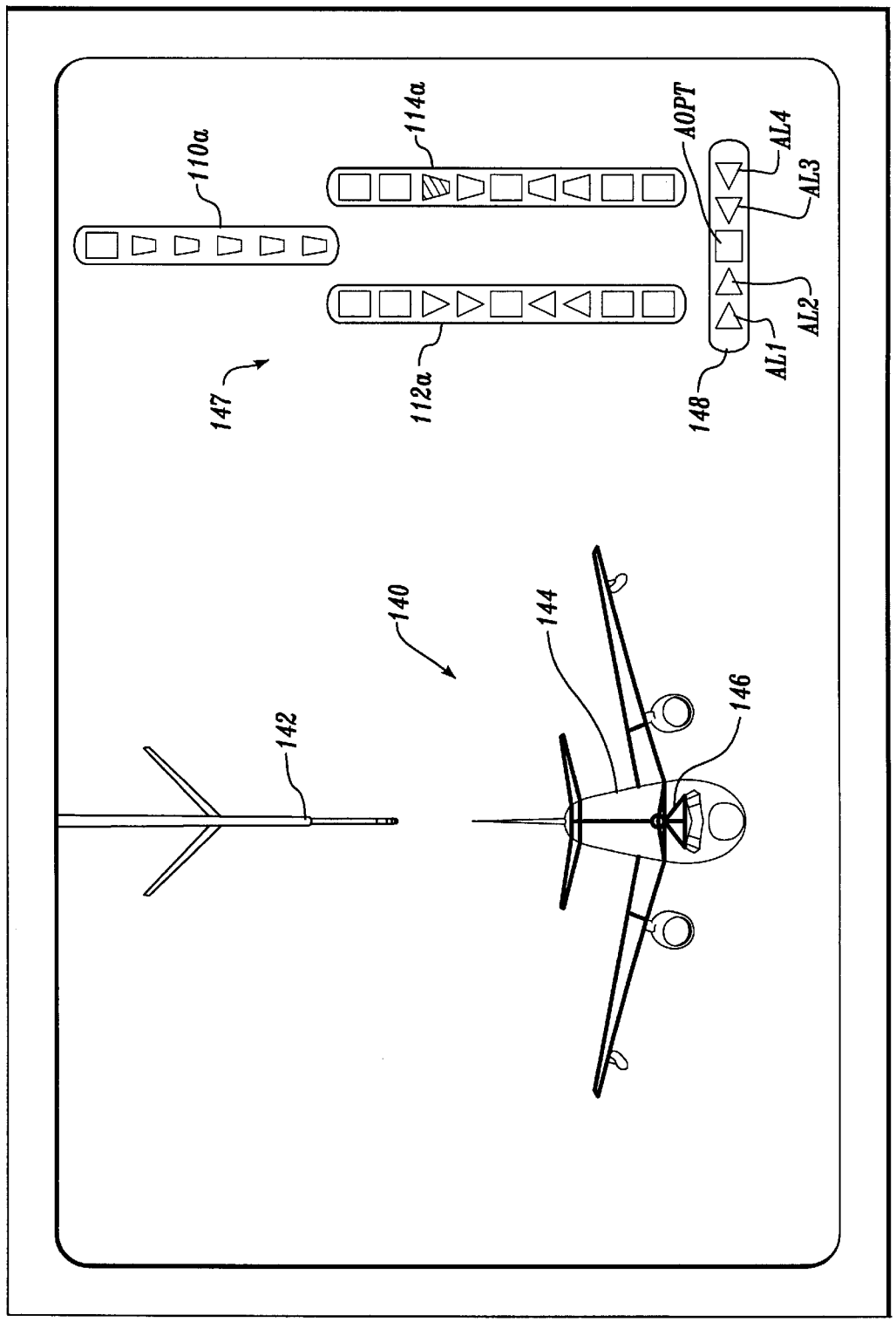
FIG. 10 is a screen shot illustrating the objects displayed on the boom operator's monitor.

As noted above and shown in FIG. 3, the boom operator interface 74 includes an interface device 82 and a monitor 83. The boom operator monitor 83 displays an image of the type shown in FIG. 10. The image includes a 3-D image 140 created from data generated by the camera system 72, a selected geometric model 146, an image of the pilot viewed director light array 147 and an azimuth lightbar 148. The 3-D image 140 includes the objects present in the camera's field of view, specifically, an image of the refueling boom 142 and an image of the receiving aircraft 144. The image of the pilot viewed director light array 147 includes a first lightbar 110a that corresponds to the approach lightbar 110, a second lightbar 112a that corresponds to the elevation lightbar 112 and on third lightbar 114a that corresponds to the fore/aft lightbar 114. The azimuth lightbar 148 supplies the boom operator with information regarding lateral aircraft receptacle position relative to the optimum refueling position. The origin and processing of information for the objects displayed in FIG. 10 are described in more detail below with respect to FIG. 11. The azimuth lightbar 148 is displayed as a generated image horizontally only a the boom operator display. In the illustrated embodiment of the invention, the azimuth lightbar 148 includes triangular lights AR1, AR2, AL3 and AL4, and rectangular light AOPT. Located a the right side of the azimuth lightbar 148 are lights AL3 and AL4 which point to the left. Light AL3 is further left than AL4. Located to the left are lights AR1 and AR2. Light AR2 is further right than AR1 and lights AR1 and AR2 point to the right. Lights AR1, AR2, AL3 and AL4 are amber or yellow colored. Located between AR2 and AL3 is green colored light AOPT.

Figure 11:
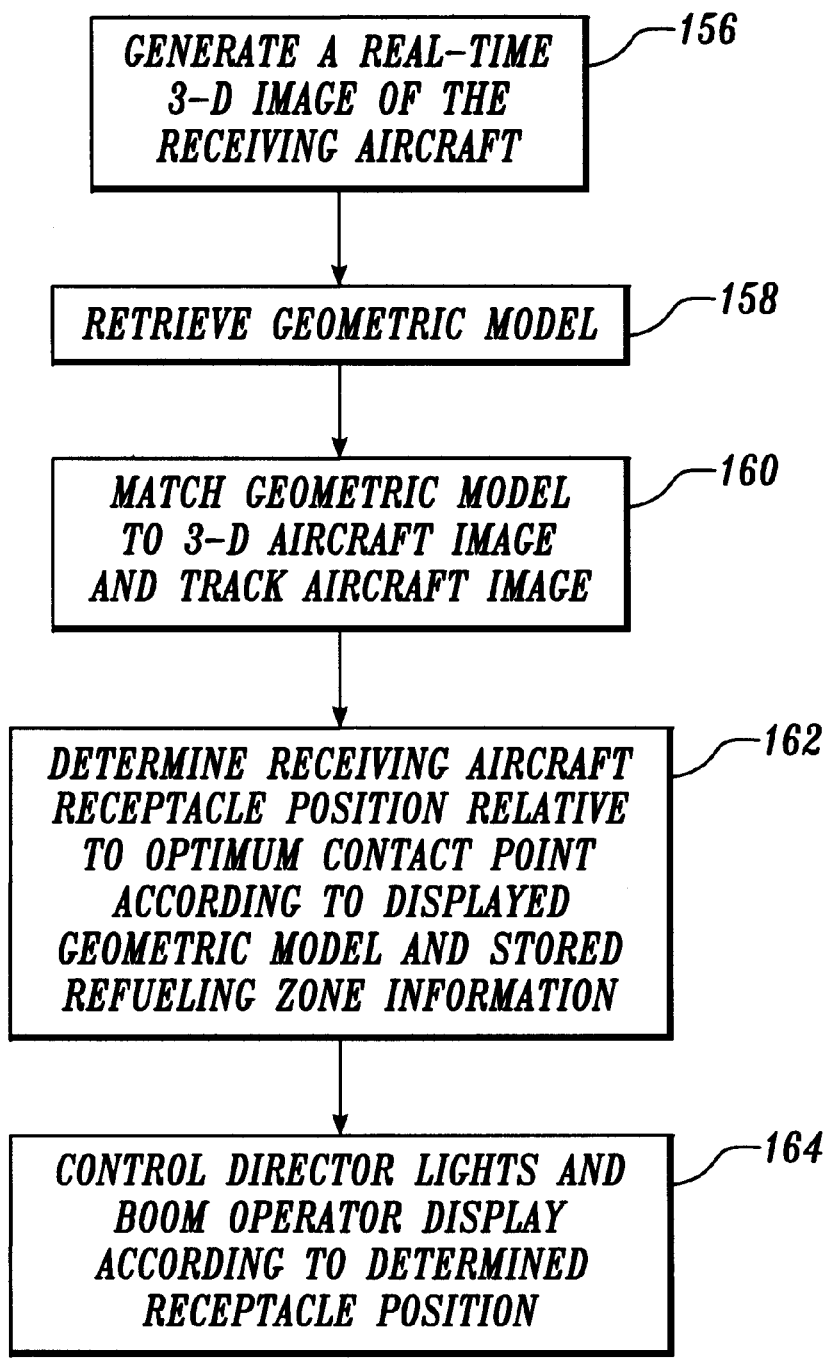
FIG. 11 is a flow diagram illustrating the operation of the present invention.

FIG. 11 illustrates the process performed by the present invention. First, a real-time 3-D image of the receiving aircraft is generated, at block 156. Then at block 158, a geometric model image that corresponds to the receiver aircraft is retrieved from memory. The first two steps are described in more detail below with respect to FIG. 12. Next, the geometric model image is matched to the 3-D aircraft image and the system tracks the 3-D aircraft image, at block 160. The steps of block 160 are described in more detail below with respect to FIG. 13. Then, the system determines aircraft receptacle position relative to optimum boom contact point according to the tracking geometric model image and refueling zone information, at block 162. Finally, the system controls the director light array according to the determined receptacle position, at block 164. The final two steps are described in more detail below with respect to FIGS. 14–19.

Figure 12:
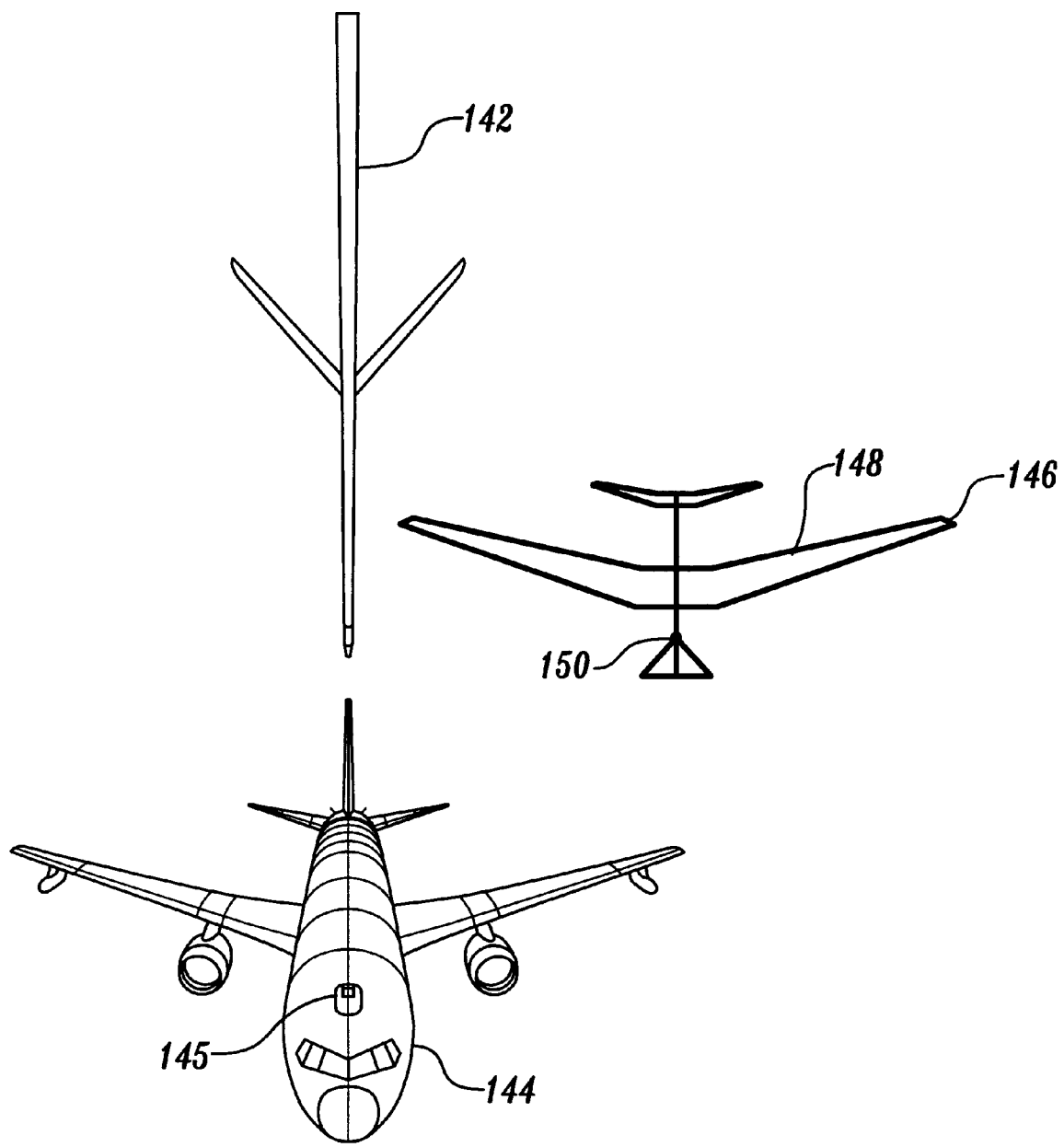

FIGS. 12 and 13 are parts of the display shown on the boom operator's monitor 83 that illustrate a 3-D image 140 including the boom 142 and the receiving aircraft 144 and a geometric model image 146. The video image processor 80 receives digitized video images from the pair of CCD cameras 90 and 91 and generates real-time combined 3-D video images. The digitized video images include the objects viewed by the CCD cameras 90 and 91 within the vision cones 96 and 98, specifically, the boom 104 and the receiving aircraft 144. The image generator 81 then generates the images 142 and 144 on the boom operator's monitor 83.

The boom operator uses the boom operator interface device 82 to retrieve a stored geometric model that corresponds to the receiving aircraft 144. As will be readily appreciated by those of ordinary skill in the computer art, a number of methods may be used for retrieving a stored geometric model. For example, the boom operator monitor may include a graphical user interface such as a pull-down menu, that lists the aircraft geometric models stored in memory 76. The boom operator may interact with the graphical user interface using the interface device 82, which may take the form of a mouse or keyboard. Alternatively, image analysis software may be used to automatically retrieve stored geometric models. For example, the 3-D image of the receiving aircraft 144 can be compared against the stored geometric models, whereby the closest matching geometric model is retrieved from memory 76.

The retrieved geometric model is delivered to the image generator 81. The image generator 81 then generates the geometric model image 146 at a predefined location on the boom operator display 83. The geometric model image 146 is a stick model outline 148 that includes a tracking geometric model nozzle receiver point 150. The stick model outline 148 is predefined to correspond to unique geometric features of the aircraft it represents. The tracking geometric model nozzle receiver point 150 indicates the refueling receptacle position as it corresponds to specific aircraft unique geometric features.

As shown in FIG. 13, the geometric model image 146 is displayed overlaying the receiving aircraft image 144. In order to accomplish this overlay, the geometric model image 146 is dragged onto the real time image of the receiving aircraft 3-D image 144. Once overlaid, the tracking geometric model nozzle receiver point 150 of the geometric model image 146 and real time image nozzle receiver point 145 of the 3-D receiving aircraft image 144 are collocated. As will be readily appreciated by those of ordinary skill in computer graphics art, the images may be overlaid in a number of various ways. For example, the boom operator may use the boom operator interface device 82 to activate a cursor on the geometric model image 146 and drag the cursor and geometric model image 146 onto the 3-D receiving aircraft image 144. After the overlay is accomplished, the boom operator will deactivate the cursor, leaving the 3-D receiving aircraft image 144 overlaying the geometric model image 146. More than likely, when the boom operator overlays the geometric model image 146 onto the real time 3-D receiving aircraft image 144, the images will not correctly line-up. In order to improve the overlay, preferably, processor 84 includes image convergent software that adjusts the geometric model image 146 to properly match the real time 3-D receiving aircraft image 144. As shown in FIG. 13, a proper match occurs when the stick model outline 148 overlays the components of the real time 3-D receiving aircraft image 144 that the stick model outline 148 corresponds to. The image convergent software also provides image tracking functionality. The image tracking functionality allows the geometric model image 146 to maintain a precise overlay of the real time 3-D receiving aircraft image 144 as that image moves about the refueling operator display 83.

Figure 14:
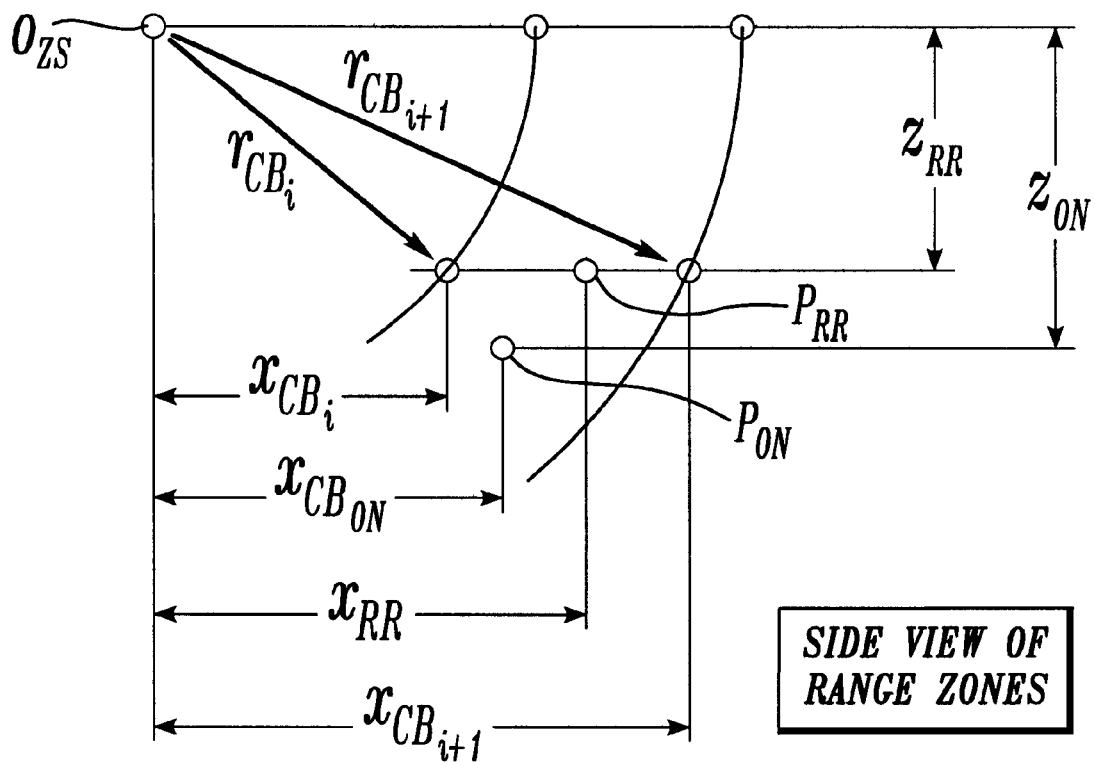
FIGS. 14 and 15 are side views of refueling range zones designated geometry.

Illumination of the director light system depends upon the processor's determination of where the tracking geometric model nozzle receiver point 150 is relative to predetermined elevation, range and azimuth zones and boundaries. FIG. 14 illustrates the geometrical relationships of the range position of the receiver point 150 in the airspace behind and below the refueling aircraft 94 designated for refueling operations. The receiver point's range position provides information for the approach and fore/aft lightbar display 110 and 114 and the corresponding image on the boom operator's monitor 83. An initial reference point $O_{ZS}$ is the pivot point of the refueling boom. $P_{ON}$ is the optimum receptacle position for refueling. The following equations are executed in the CPU 70 for determining range position of the receiver point 150.

$$X_{CB} = (R_{CB_i}^2 - Z_{RR}^2)^{1/2} \qquad (1)$$

$$X_{CB_i} < X_{RR} X_{CB_{i+1}} \qquad (2)$$

i=zone boundary number.

$X_{RR}$, $Z_{RR}$=actual range and elevation values of receiver point 150.

$X_{CB}$=boundary range value.

First, the actual range $X_{RR}$, elevation $Z_{RR}$ and azimuth $Y_{RR}$ are determined. The processor 84 determines the actual range, elevation and azimuth according to receiver point's position relative to refueling pivot point $O_{ZS}$. The processor 84 analyzes geometric model image 146 as it tracks the real-time 3-D receiving aircraft image 144 and determines from this analysis the receiver receptacle contact point location $P_{RR}$ relative to pivot point $O_{ZS}$. One suitable way is to use the system available from TAU Corporation of Los Gatos, Calif., which integrates image analysis and photogrammetric functions with a graphical user interface. The TAU system is operable with input of a single static frame image or multiple synchronized video segments. First, the TAU system uses a least square technique for automatic matching of three or more points of a geometric model to a video image. Then, the geometric models position in 3-D space is determined according to its X, Y and Z positions and its roll, pitch and yaw attitudes. As will be readily appreciated by those of ordinary skill in the image analysis art, the processor 84 is able to determine receiver point 150's positions in 3-D space from an analysis of the stick model outline 148. The shape, size and attitude of stick model outline 148 as it appears on the boom operator's monitor 83, as shown in FIG. 10, provides enough information for the processor 84 to analyze and determine the position of the receiver point 150 in the 3-D space relative to a known fixed point, namely, pivot point $O_{ZS}$.

As shown in Equation 1 above, the actual elevation value $Z_{RR}$ and the radius value $R_{CB_i}$ for the boundaries of predefined zones determine all upper and lower zone range values. The zone boundary logic file 85 stores the boundary radius values. As shown in Equation 2, a simple logic evaluation is performed for determining which zone contains the receiver point 150. The actual range value $X_{RR}$ is compared against the predetermined zone boundary range values $X_{CB_i}$ and $X_{CB_{i+1}}$.

TABLE 1

| Range Zone Designation | Inner Boundary Radius | Outer Boundary Radius | Zone Thickness (Inches) | Boundary Value Look Up Table | |
|---|---|---|---|---|---|
| | | | | i = ( ) | Boundary |
| $RZ_1$ | 510 | 525 | 15 | 1 | 510 |
| $RZ_2$ | 525 | 550 | 25 | 2 | 525 |
| $RZ_3$ | 550 | 575 | 25 | 3 | 550 |
| $RZ_4$ | 575 | 588 | 13 | 4 | 575 |
| $RZ_5$ | 588 | 600 | 12 | 5 | 588 |
| $RZ_6$ | 600 | 612 | 12 | 6 | 600 |
| $RZ_7$ | 612 | 625 | 13 | 7 | 612 |
| $RZ_8$ | 625 | 650 | 25 | 8 | 625 |
| $RZ_9$ | 650 | 675 | 25 | 9 | 650 |
| $RZ_{10}$ | 675 | 690 | 15 | 10 | 675 |
| $RZ_{11}$ | 690 | 810 | 120 | 11 | 690 |
| $RZ_{12}$ | 810 | 930 | 120 | 12 | 810 |
| $RZ_{13}$ | 930 | 1050 | 120 | 13 | 930 |
| $RZ_{14}$ | 1050 | 1170 | 120 | 14 | 1050 |
| $RZ_{15}$ | 1170 | 1290 | 120 | 15 | 1170 |
| $RZ_{16}$ | 1290 | 1410 | 120 | 16 | 1290 |
| | | | | 17 | 1410 |

Figure 15:
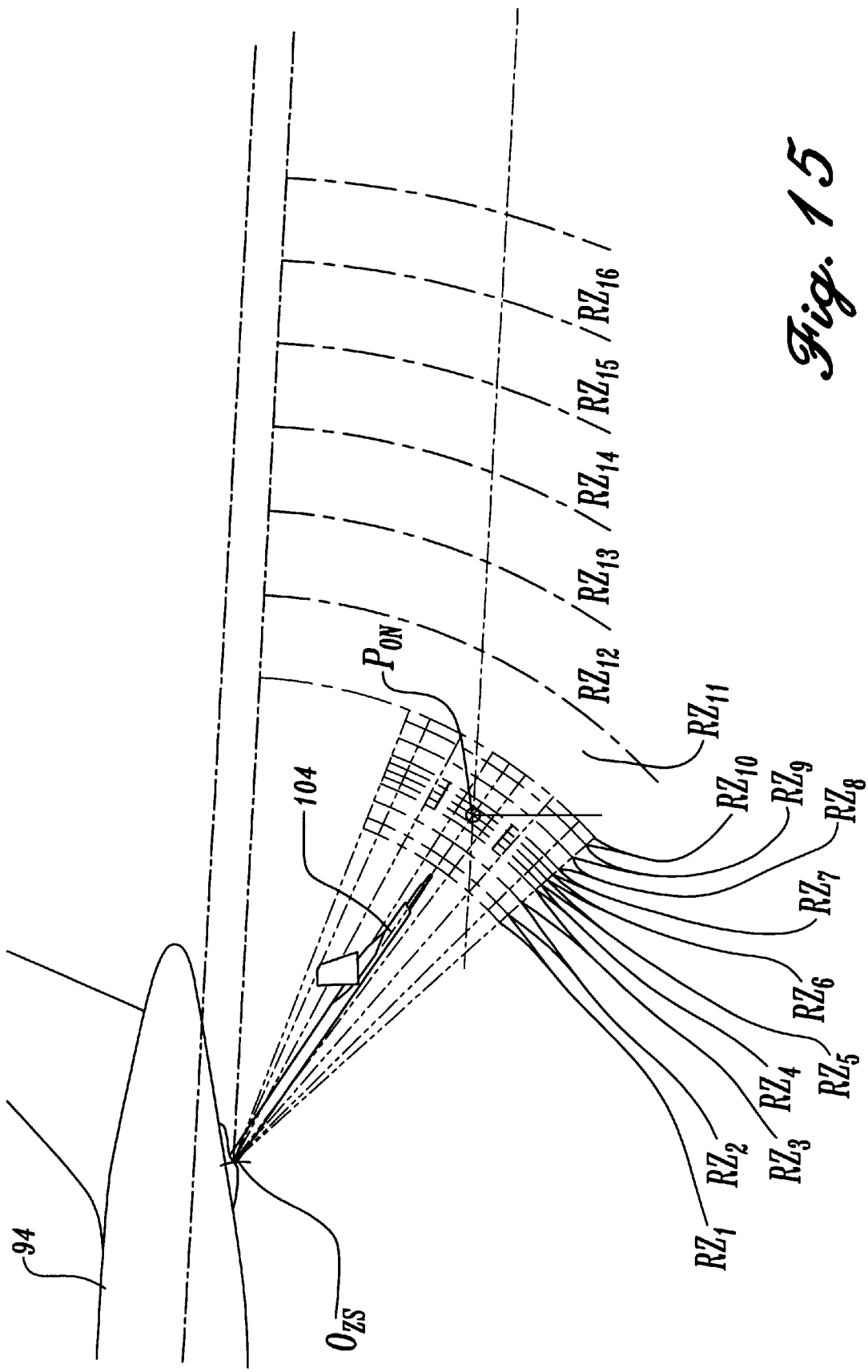

Table 1 illustrates predefined inner and outer zone boundary, columns 162 and 164 radii in inches of the 16 different zones identified by $RZ_1$–$RZ_{16}$, as shown in FIG. 15. For example, range zone 1 ($RZ_1$) is 15 inches thick with inner and outer boundary radii of 510 inches and 525 inches measured from the refueling probe pivot point $O_{ZS}$. The fourth column shows zone thickness in inches and the fifth column shows boundary radius values. The zones vary in thickness, with the boundaries located furthest away from optimum contact position having the greatest thickness. For example, the zone designated $RZ_4$ is 13 inches thick and $RZ_{16}$ is 120 inches thick. The inner boundary radius of zone $RZ_1$ is the inner radius of the refuel envelope 100. The inner radius of zone $RZ_{11}$ corresponds to the outer radius of the refuel envelope 100. The inner radius of zone $RZ_4$ corresponds to the inner radius of the contact envelope 102. The outer radius of zone $RZ_7$ corresponds to the outer radius of the contact envelope 102.

TABLE 2

| i = | $X_{RR}$ Location | Light and Condition | | |
|---|---|---|---|---|
| 16 | $X_{CB_{16}} < X_{RR} < X_{CB_{17}}$ | FA - Steady | — | — |
| 15 | $X_{CB_{15}} < X_{RR} < X_{CB_{16}}$ | RF8 - Steady | FA - Steady | — |
| 14 | $X_{CB_{14}} < X_{RR} < X_{CB_{15}}$ | RF7 - Steady | RF8 - Steady | — |
| 13 | $X_{CB_{13}} < X_{RR} < X_{CB_{14}}$ | RF6 - Steady | RF7 - Steady | — |
| 12 | $X_{CB_{12}} < X_{RR} < X_{CB_{13}}$ | RF5 - Steady | RF6 - Steady | — |
| 11 | $X_{CB_{11}} < X_{RR} < X_{CB_{12}}$ | RF4 - Steady | RF5 - Steady | — |
| 10 | $X_{CB_{10}} < X_{RR} < X_{CB_{11}}$ | RF3 - Steady | RF4 - Steady | FE - Steady |
| 9 | $X_{CB_9} < X_{RR} < X_{CB_{10}}$ | RF2 - Steady | RF3 - Steady | FE - Steady |
| 8 | $X_{CB_8} < X_{RR} < X_{CB_9}$ | RF1 - Steady | RF2 - Steady | FE - Steady |
| 7 | $X_{CB_7} < X_{RR} < X_{CB_8}$ | ROPT - Steady | RF1 - Steady | FE - Steady |
| 6 | $X_{CB_6} < X_{RR} < X_{CB_7}$ | ROPT - Steady | — | — |
| 5 | $X_{CB_5} < X_{RR} < X_{CB_6}$ | ROPT - Steady | — | — |
| 4 | $X_{CB_4} < X_{RR} < X_{CB_5}$ | ROPT - Steady | RA1 - Steady | AL - Steady |
| 3 | $X_{CB_3} < X_{RR} < X_{CB_4}$ | RA1 - Steady | RA2 - Steady | AL - Steady |

TABLE 2-continued

| i = | $X_{RR}$ Location | Light and Condition | | |
|---|---|---|---|---|
| 2 | $X_{CB_2} < X_{RR} < X_{CB_3}$ | RA2 - Steady | RA3 - Steady | AL - Steady |
| 1 | $X_{CB_1} < X_{RR} < X_{CB_2}$ | RA3 - Steady | — | AL - Steady |
|   | $X_{RR} \leq X_{CB_1}$ | RA3 - Blink | — | AL - Steady |

Table 2 illustrates the condition of lights according to the zone determined range position of the actual range value $X_{RR}$. All approach lightbar and fore/aft lightbar illuminations are steady except in the last row. As shown in the last row, if the range value is less than the inner boundary $X_{CB_i}$ of zone $RZ_1$, light AL is in a steady mode and light RA3 is in a blinking mode. Thus, the range information supplied to the receiving aircraft pilot via the light arrays 110 and 114 allows the pilot to quickly determine relative range position. For example, if the aircraft's receptacle is in the optimum range position $RZ_5$ or $RZ_6$, the green ROPT light is in the steady illumination mode, thereby indicating to the pilot that the range of the boom nozzle receiver 107 is in the optimum range position.

As will be readily appreciated by those of ordinary skill in the air-to-air refueling art, boundary values may vary depending upon the types of light arrays used and the amount of information system developers wish to convey through the light arrays to the receiving aircraft pilots.

Figure 16:
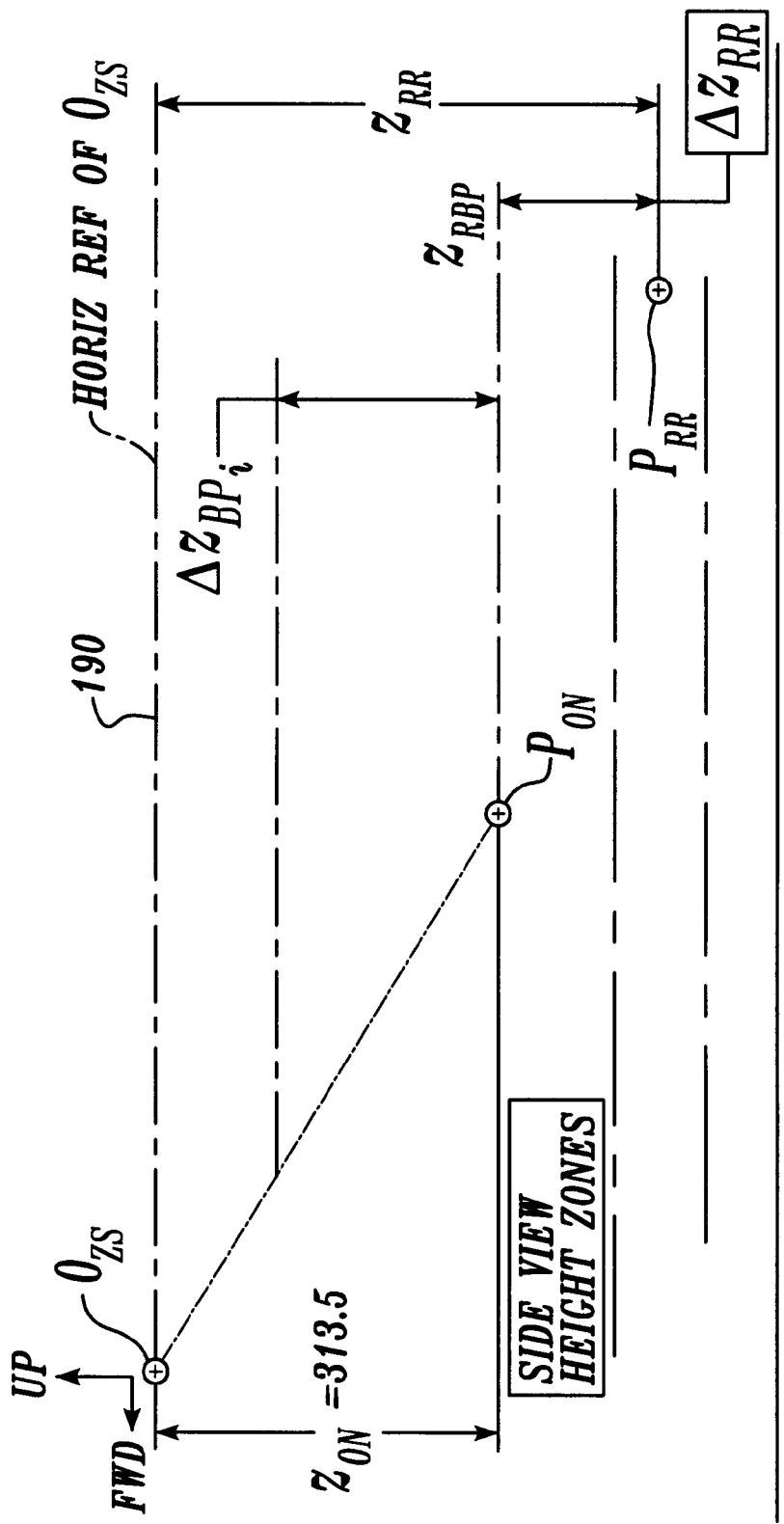
FIGS. 16 and 17 are side views of refueling elevation zones designated geometry.

As shown in FIG. 16, $Z_{ON}$ is the elevation value for optimum refueling position $P_{ON}$ as measured from a horizontal reference plane 190 that extends horizontally from refueling pivot point $O_{ZS}$. Preferably, $Z_{ON}$ is equal to 313.5 inches. $Z_{RBP}$ is an elevation reference plane parallel to horizontal reference plane 190 at a distance of $Z_{ON}$ from horizontal reference plane 190. All elevation zone boundaries are measured from reference plane $Z_{RBP} \Delta Z_{BP_i}$ is a boundary plane above or below reference plane $Z_{RBP}$ for the zone equal to i. Again, $Z_{RR}$ represents aircraft boom receiver receptacle elevation position.

$$\Delta Z_{RR} = Z_{RR} - Z_{ON} \quad (3)$$

The processor 84 executes Equation 3 to determine whether actual elevation $Z_{RR}$ is above or below reference plane $Z_{RBP}$.

$$\Delta Z_{BP_i} < \Delta Z_{RR} \Delta Z_{BP_{i+1}} \quad (4)$$

Once actual elevation $Z_{RR}$ is determined, as described above, the processor 84 executes Equation 4 to determine which elevation zone boundaries stored in the zone boundary logic file 85 contain $\Delta Z_{RR}$.

Figure 17:
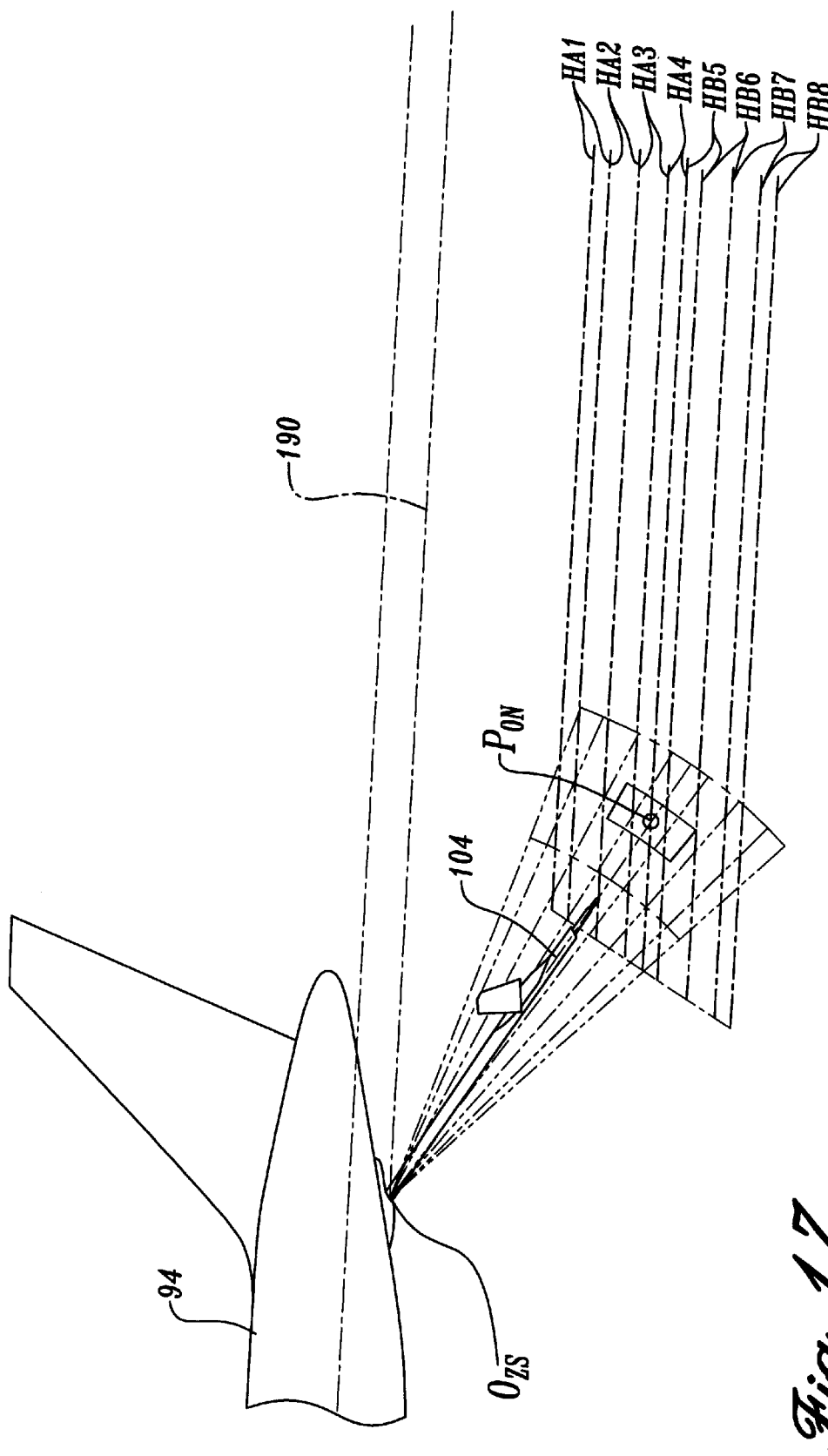

FIG. 17 illustrates a side view of the elevation zone boundaries. There exist four zones, HA1–HA4 in descending order above reference plane $Z_{RBP}$. Also shown are four elevation zones, HB5–HB8 in descending order below reference plane $Z_{RBP}$. A ninth zone exists below the lower zone boundary of zone HB8.

TABLE 3

| Vertical Zone Designation | | Upper Boundary Relative to $Z_{RBP}$ ($\Delta Z_{BP_i}$) | Lower Boundary Relative to $Z_{RBP}$ ($\Delta Z_{BP_i}^{+1}$) | Boundary Value Look-Up Table | |
|---|---|---|---|---|---|
| Above | Below | | | i = ( ) | Boundary |
| HA1 | | −120.0 | −98.0 | 1 | −120.0 |
| HA2 | | −98.0 | −60.0 | 2 | −98.0 |
| HA3 | | −60.0 | −22.0 | 3 | −60.0 |
| HA4 | | −22.0 | 0.0 | 4 | −22.0 |
| | HB5 | 0.0 | 22.0 | 5 | 0.0 |
| | HB6 | 22.0 | 60.0 | 6 | 22.0 |
| | HB7 | 60.0 | 98.0 | 7 | 60.0 |
| | HB8 | 98.0 | 120.0 | 8 | 98.0 |
| | | | | 9 | 120.0 |

Table 3 illustrates the predetermined upper and lower elevation boundaries for each of the elevation zones. Elevation zone thickness is predetermined to provide adequate zone thickness for providing accurate elevation information to the receiving aircraft pilot. Table 3 indicates nine zone boundaries, as illustrated by the far right column. The nine zone boundaries create the eight zones HA1–HA4 and HB5–HB8.

TABLE 4

| i = | $\Delta Z_{RR}$ Location | Light and Condition | | |
|---|---|---|---|---|
| | $\Delta Z_{RR} = \Delta Z_{BP_1}$ | HA3 - Blink | DL - Steady | — |
| 1 | $\Delta Z_{BP_1} < \Delta Z_{RR} < \Delta Z_{BP_2}$ | HA3 - Steady | DL - Steady | — |
| 2 | $\Delta Z_{BP_2} < \Delta Z_{RR} < \Delta Z_{BP_3}$ | HA2 - Steady | HA3 - Steady | DL - Steady |
| 3 | $\Delta Z_{BP_3} < \Delta Z_{RR} < \Delta Z_{BP_4}$ | HA1 - Steady | HA2 - Steady | DL - Steady |
| 4 | $\Delta Z_{BP_4} < \Delta Z_{RR} < \Delta Z_{RBP}$ | HOPT - Steady | — | — |
| 5 | $\Delta Z_{RBP} < \Delta Z_{RR} < \Delta Z_{BP_5}$ | HOPT - Steady | — | — |
| 6 | $\Delta Z_{BP_5} < \Delta Z_{RR} < \Delta Z_{BP_6}$ | HB1 - Steady | HB2 - Steady | UL - Steady |
| 7 | $\Delta Z_{BP_6} < \Delta Z_{RR} < \Delta Z_{BP_7}$ | HB2 - Steady | HB3 - Steady | UL - Steady |
| 8 | $\Delta Z_{BP_7} < \Delta Z_{RR} < \Delta ZBP_8$ | HB3 - Steady | UL - Steady | — |
| | $\Delta Z_{BP_8} < \Delta Z_{RR}$ | HB3 - Blink | UL - Steady | — |

Table 4 indicates light illumination and the condition of the illumination according to the actual elevation zone position. Zones i=4 and 5 are the optimum elevations zones for refueling. Therefore, when $-Z_{RR}$ is in zone i=4 or 5, the HOPT light is on and steady.

Figure 18:
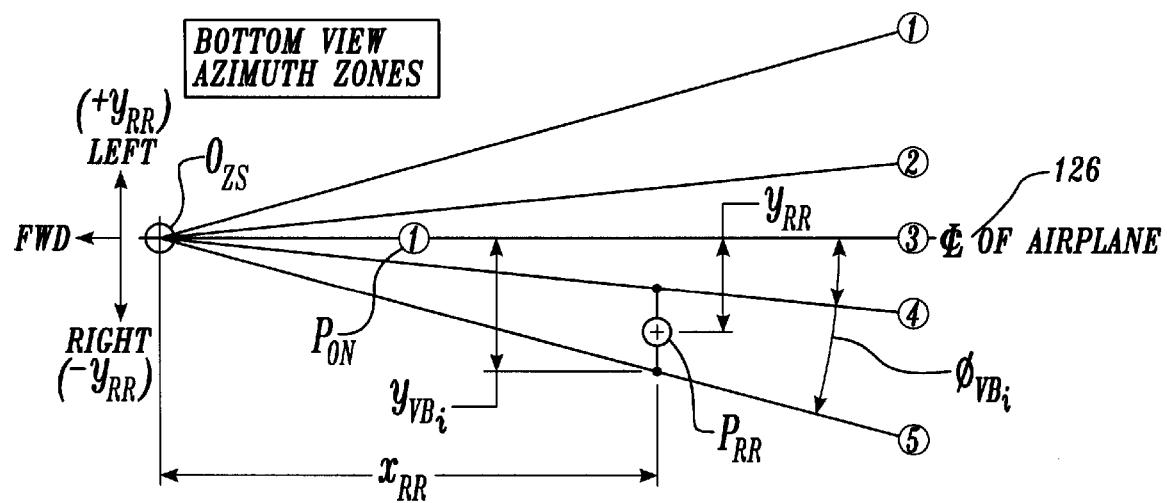
FIGS. 18 and 19 are bottom views of refueling azimuth zones designated geometry.

As shown in FIG. 18, four azimuth zones exist as a result of five predefined azimuth zone boundaries. FIG. 18 is a bottom view of the azimuth zones as they extend from pivot point $O_{ZS}$. The optimum refueling point $P_{ON}$ is along the airplane centerline 126, thus creating the reference azimuth plane.

TABLE 5

| Azimuth Zone Designation | Outer Boundary Angle (deg) | Inner Boundary Angle (deg) | Boundary Value Look Up Table | |
|---|---|---|---|---|
| | | | i=( ) | $\phi_{VB}$ (deg) |
| | ∅VB | ∅VB | 1 | +15.0 |
| R1 | +15.0 | +6.0 | 2 | +6.0 |
| R2 | +6.0 | 0.0 | 3 | 0.0 |
| LA3 | −6.0 | 0.0 | 4 | −6.0 |
| LA4 | −15.0 | −6.0 | 5 | −15.0 |

Figure 19:
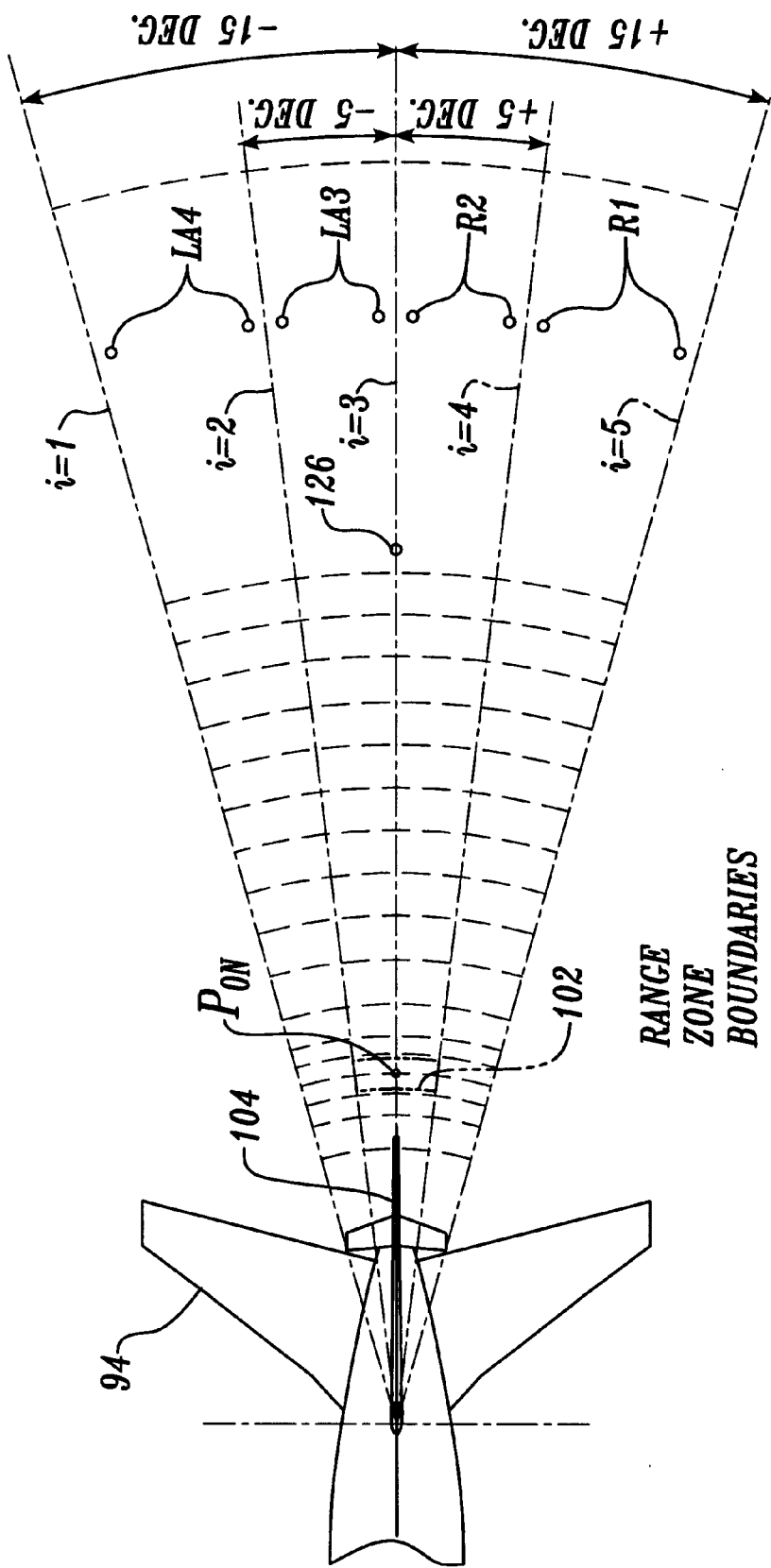

As shown in FIG. 19, the four azimuth zones are labeled port to starboard LA4, LA3, R2, and R1. The inner and outer boundary angles in degrees relative to the reference azimuth plane are illustrated in the middle two columns of Table 5. The last column in Table 5 shows the degree value for the five zone boundary lines. Processor 84 executes Equation 5 to determine azimuth values on the boundary lines.

$$Y_{VB_i} = X_{RR} \text{TAN} \theta_{VB_i} \tag{5}$$

$\theta_{VB_i}$=angle of azimuth boundary equal to i relative to the centerline of the airplane.

$Y_{VB_i}$=the distance from the centerline of the airplane at a range of $X_{RR}$ that intercepts the azimuth boundary $\theta_{VB_i}$.

$$Y_{VB_i} > Y_{RR} Y_{VB_{i-1}} \tag{6}$$

Once the range values that intercept the azimuth zone boundaries are known, the actual azimuth position $Y_{RR}$ must satisfy Equation 6 to determine the zone location of the boom nozzle receiver 107.

TABLE 6

| i = | $Y_{RR}$ Location | Light and Condition |
|---|---|---|
| 1 | $Y_{VB_1} > Y_{RR} > Y_{VB_2}$ | AL4 - Steady |
| 2 | $Y_{VB_2} > Y_{RR} > Y_{VB_3}$ | AL3 - Steady; AL4 - Steady |
| 3 | $Y_{RR} = 0.0 \pm 12.0$ | AOPT - Steady |
| 4 | $Y_{VB_3} > Y_{RR} > Y_{VB_4}$ | AR2 - Steady; AR1 - Steady |
| 5 | $Y_{VB_4} > Y_{RR} > Y_{VB_5}$ | AR1-Steady |

Table 6 displays azimuth light illumination and illumination conditions according to actual azimuth position $Y_{RR}$ relative to the zone boundaries i=1–5. If i is equal to three, $\theta_{VB}$ is equal to zero, thereby the boom nozzle receiver 107 is on the centerline of the aircraft. However, it would be very rare for the azimuth position of the boom nozzle receiver 107 to be equal to zero, therefore the ±12, as shown in row i=3 provides a centerline width of, preferably, 24 inches, 12 inches on either side of the centerline, which activates light AOPT.

$$X_{RR} > X_{CB_{17}} \text{ and;} \tag{7}$$

$$Y_{VB_1} < Y_{RR} < Y_{VB_5} \text{ and}$$

$$\Delta Z_{BP_8} < \Delta Z_{RR}$$

All lights in the lightbars 110, 112 and 114 are always illuminated at an intensity less than full illumination intensity and greater than an off state, provided the conditions of Equation 7 are met. With a low intensity illumination the receiver aircraft pilot can visually acquire the lightbars with the understanding that the receiver aircraft is not in a position to receive position information: actual range $X_{RR}$ outside outer range boundary $X_{CB_{17}}$, actual azimuth value $Y_{RR}$ outside port zone boundary $Y_{VB_1}$ or offside starboard zone boundary $Y_{VB_5}$; and elevation position $\Delta Z_{RR}$ below the lower $\Delta Z_{BP_8}$ boundary.

A preferred refueling operation procedure begins with the receiver aircraft pilot achieving a stabilized position at the outer end of the approach zone. The pilot adjusts receiver aircraft elevation position to capture the optimum height light cue HOPT for nozzle receiver 107 and boom contact. Then, the receiver aircraft pilot advances through the approach zone, maintaining HOPT, until boom receiver 107 enters refuel envelope 100. Nozzle receiver range position is now visible on the fore/aft lightbar 114. The pilot continues moving the receiving aircraft forward until the light ROPT illuminates to full intensity. Lights HOPT and ROPT are illuminated at full intensity, thereby indicating nozzle receiver 107 is within the contact envelope 102.

Preferably, the lights of the director lights 88 are formed by properly colored light emitting diode (LED) arrays. As compared to incandescent lights behind colored overlays, LEDs provide improved visibility during varied lighting conditions.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A director light apparatus in operative relation to a first aircraft for providing a pilot in a second aircraft visual information regarding the second aircraft's position relative to the first aircraft; said apparatus comprising:
    a 3-D camera system for generating a real time 3-D video image of the second aircraft;
    a first memory for storing at least one geometric model of at least one aircraft;
    a selecting means for selecting a stored geometric model based a the 3-D video image of the second aircraft;
    a display device for displaying said generated real time 3-D video image and said selected geometric model;
    a matching means for matching the displayed geometric model to said displayed real time 3-D video image;
    a second memory for storing predefined zone information;
    a processor for determining the position of the second aircraft relative to said stored zone information according to said matched geometric model and generating control signals according to said determined second aircraft position; and
    director lights mounted on the outside of the first aircraft for displaying position information visible to the pilot of the second aircraft according to said generated control signals.

2. The apparatus of claim 1, wherein:
    said zone information comprises a predefined elevation plane, fore/aft plane and azimuth plane referenced from a predefined point relative to the first aircraft; and
    said control signals comprise elevation, range and azimuth signals determined according to said determined second aircraft position relative to said predefined elevation plane, fore/aft plane and azimuth plane, respectively.

3. The apparatus of claim 2, wherein:
    said director lights comprise an elevation light bar array, a fore/aft lightbar array and an approach lightbar array;
    said elevation light bar array illuminates according to said generated elevation signals; and
    said fore/aft lightbar array and approach lightbar array illuminate according to said generated range signals.

4. The apparatus of claim 2, further comprising an image generator for generating:
    an elevation lightbar image according to said generated elevation signals;
    a fore/aft lightbar image and an approach lightbar image according to said generated range signals; and
    and an azimuth lightbar image according to said generated azimuth signals on said display device.

5. The apparatus of claim 1, wherein the 3-D camera system comprises two CCD cameras mounted to the first aircraft for viewing the airspace below and aft of a predetermined point a the bottom of the first aircraft.

6. The apparatus of claim 1, wherein said matching means comprises a user interactive device for matching the displayed geometric model to said displayed real time 3-D video image.

7. A method for generating visual information from a first aircraft to a pilot in a second aircraft regarding the second aircraft's position relative to the first aircraft; said method comprising:

generating a real time 3-D video image of the second aircraft;

storing at least one geometric model of at least one aircraft;

selecting a stored geometric model according to the 3-D video image of the second aircraft;

displaying said generated real time 3-D video image and said selected geometric model on a display device within the first aircraft;

matching the displayed geometric model to said displayed real time 3-D video image;

storing predefined zone information;

determining the position of said second aircraft relative to said stored zone information according to said matched geometric model;

generating control signals according to said determined second aircraft position; and displaying position information visible to the pilot of the second aircraft and an operator within the first aircraft according to said generated control signals.

8. The method of claim 7, wherein:

said zone information comprises a predefined elevation plane, fore/aft plane and azimuth plane referenced from a predefined point relative to the first aircraft; and said control signals comprise elevation, range and azimuth signals determined according to said determined second aircraft position relative to said predefined elevation plane, fore/aft plane and azimuth plane, respectively.

9. The method of claim 8, further comprising:

generating an elevation lightbar image according to said generated elevation signals, a fore/aft lightbar image and an approach lightbar image according to said generated range signals and an azimuth lightbar image according to said generated azimuth signals a said display device.

* * * * *

UNITED STATES PATENT AND TRADEMARK OFFICE
CERTIFICATE OF CORRECTION

PATENT NO. : 5,904,729
DATED : May 18, 1999
INVENTOR(S) : D.E. Ruzicka

Page 1 of 2

It is certified that error appears in the above-identified patent and that said Letters Patent is hereby corrected as shown below:

| COLUMN | LINE | | | |
|---|---|---|---|---|
| [56] Pg. 1, col. 1 | U.S. Patents | Please insert the following references: | | |
| | | --5,530,650 | 6/1996 | Biferno et al. |
| | | 5,493,392 | 2/1996 | Blackmon et al. |
| | | 5,499,784 | 3/1996 | Crabere et al. |
| | | 4,158,885 | 6/1979 | Neuberger |
| | | 4,763,125 | 8/1988 | Newman et al. |
| | | 4,763,861 | 8/1988 | Newman |
| | | 4,025,193 | 5/1977 | Pond et al. |
| | | 3,917,196 | 11/1975 | Pond et al.-- |
| 12 (Claim 1, | 20 line 10) | "based a" should read --based on-- | | |
| 12 (Claim 5, | 63 line 4) | "point a" should read --point on-- | | |

UNITED STATES PATENT AND TRADEMARK OFFICE
CERTIFICATE OF CORRECTION

PATENT NO. : 5,904,729
DATED : May 18, 1999
INVENTOR(S) : D.E. Ruzicka

It is certified that error appears in the above-identified patent and that said Letters Patent is hereby corrected as shown below:

COLUMN      LINE

14              19              "signals a" should read --signals on--
(Claim 9,  line 6)

Signed and Sealed this

Fourth Day of April, 2000

Attest:

Attesting Officer

Q. TODD DICKINSON

Director of Patents and Trademarks